US010642251B2

(12) United States Patent
Platts et al.

(10) Patent No.: US 10,642,251 B2
(45) Date of Patent: May 5, 2020

(54) SUBTRACTIVE MACHINING WORK CENTER

(71) Applicants: David E Platts, Avon, IN (US); Terry Rosenkoetter, Greenwood, IN (US)

(72) Inventors: David E Platts, Avon, IN (US); Terry Rosenkoetter, Greenwood, IN (US)

( * ) Notice: Subject to any disclaimer, the term of this patent is extended or adjusted under 35 U.S.C. 154(b) by 440 days.

(21) Appl. No.: 15/487,460

(22) Filed: Apr. 14, 2017

(65) Prior Publication Data
US 2017/0300037 A1    Oct. 19, 2017

Related U.S. Application Data

(60) Provisional application No. 62/322,272, filed on Apr. 14, 2016.

(51) Int. Cl.
    *G05B 19/4097*    (2006.01)
    *G06F 17/50*    (2006.01)
    (Continued)

(52) U.S. Cl.
    CPC ... *G05B 19/4097* (2013.01); *G05B 19/41865* (2013.01); *G06Q 10/06311* (2013.01); (Continued)

(58) Field of Classification Search
    CPC .......... G05B 19/4097; G05B 19/41865; G05B 2219/32099; G05B 2219/32359; G05B 2219/35012; G05B 2219/35081; G06Q 10/06311; G06Q 50/04; Y02P 90/20; Y02P 90/265
    See application file for complete search history.

(56) References Cited

U.S. PATENT DOCUMENTS 6,650,960 B2    11/2003    Yoshiaki et al.
7,099,737 B2     8/2006    Suk-Hawn et al.
(Continued)

FOREIGN PATENT DOCUMENTS

CN    103076757    5/2013
EP    1 345 100    8/2005

*Primary Examiner* — Abdelmoniem I Elamin
(74) *Attorney, Agent, or Firm* — Woodard, Emhardt, Henry, Reeves & Wagner, LLP

(57) ABSTRACT

A work center for automated subtractive machining includes machine frame components, material and parts handling components, control components, and communications components. The machine frame components may include a fixturing system, a CNC, a column, a spindle, and a cutting tool. The material and parts handling components may include material handling robotics, machined part handling robotics, material viewing, machined part viewing, and racks for stock materials, tools, and finished parts. The control components may include robotics controllers, viewer controllers, fixturing control, and an interactive process plan automation control (IPPAC). The IPPAC may include process planning/editing hardware & software, process control hardware & software, a device command interpreter, CAM hardware & software, SCADA hardware & software, which may include SCADA supervisory control and/or SCADA data acquisition components, database hardware & software, and communications hardware & software.

19 Claims, 2 Drawing Sheets

(51) Int. Cl.
*G06Q 10/06* (2012.01)
*G05B 19/418* (2006.01)
*G06Q 50/04* (2012.01)

(52) U.S. Cl.
CPC ... *G06Q 50/04* (2013.01); *G05B 2219/32099* (2013.01); *G05B 2219/32359* (2013.01); *G05B 2219/35012* (2013.01); *G05B 2219/35081* (2013.01); *Y02P 90/20* (2015.11); *Y02P 90/265* (2015.11)

(56) References Cited

U.S. PATENT DOCUMENTS

| | | |
|---|---|---|
| 7,392,109 B2 | 6/2008 | Teramoto et al. |
| 7,363,103 B2 | 8/2008 | Takahashi et al. |
| 2003/0179226 A1 | 9/2003 | Kawai et al. |
| 2006/0079987 A1 | 4/2006 | Baeg et al. |
| 2006/0129270 A1 | 6/2006 | Pankl |
| 2008/0109097 A1 | 8/2008 | Takahashi et al. |
| 2011/0210107 A1 | 9/2011 | Hammann et al. |
| 2015/0185727 A1 | 7/2015 | Shi |
| 2015/0261204 A1 | 9/2015 | Honda |
| 2016/0089761 A1* | 3/2016 | Crowley ............ B23Q 3/064 29/407.05 |
| 2017/0282457 A1* | 10/2017 | Burns ............... B33Y 10/00 |
| 2018/0202270 A1* | 7/2018 | Falk ................. B23K 26/34 |

* cited by examiner

SUBTRACTIVE MACHINING WORK CENTER

REFERENCE TO RELATED APPLICATIONS

This application claims the benefit of U.S. Patent Application Ser. No. 62/322,272, filed Apr. 14, 2016; the entire contents of which is incorporated into this application by reference.

FIELD OF THE INVENTION

The present invention relates generally to work centers for performing machining, and more particularly to work centers for performing subtractive machining.

BACKGROUND TO THE INVENTION

Subtractive machining is a process by which a piece of raw material is cut into a desired final shape and size by a controlled material-removal process. The part is typically designed using a computer aided design (CAD) system, and is typically manufactured using a computer assisted manufacturing (CAM) system having computer numerical control (CNC) to control the cutting tool.

Prior art machining systems suffer from problems associated with user interface complexity, non-standard or non-existent data monitoring and control interfaces, high deployment and support costs, and the lack of relevant process status feedback from controlled devices. Accordingly, present subtractive machining systems comprise "islands of automation" that do not work effectively together without significant human intervention.

A need therefore exists for a system that integrates those islands of automation into a work center that develops, evaluates, and implements a subtractive machining process, and which adds additional functionality by using real-time information regarding stocks and cutting tools to enhance the execution of the process plan. The present invention addresses that need.

SUMMARY OF THE INVENTION

The present invention provides a work center for machining a work piece. In one aspect the work center comprises:
1) machine frame components;
2) material and parts handling components;
3) work center control components;
4) an external communications center; and
5) an interactive process plan automation control (IPPAC) work center framework, including
   i) an IPPAC cabinet, and
   ii) an IPPAC work center frame.

The machine frame components may include any or all of:
a) a machine base;
b) a fixturing table and fixturing system;
c) a computer numerical control (CNC);
d) a column;
e) a spindle; and
f) a cutting tool.

The material and parts handling components may include any of all of:
a) material handling robotics;
b) machined part robotics;
c) material scanning/viewing system;
d) machined part scanning/viewing system;
e) stock material rack;
f) tool magazine; and
g) part output rack.

The work center control components may include any or all of:
a) robotics controller(s) (may include raw material handling robotics control and/or machined part handling robotics control);
b) scanner/viewer controller(s) (may include raw material handling scanner/viewer and/or machined part handling scanner/viewer);
c) fixturing control; and
d) an interactive process plan automation control (IPPAC).

The IPPAC may include any or all of:
1) process planning/editing hardware & software;
2) process control hardware & software;
3) device command interpreter;
4) CAM hardware & software;
5) Supervisory Control and Data Acquisition (SCADA) hardware & software, which may include SCADA supervisory control and/or SCADA data acquisition components;
6) database hardware & software;
7) internal communications hardware & software; and
8) a human-machine interface (HMI) host.

The work center may also include external communications hardware & software effective to communicate with a machining tool work center operator, and with a part designer, and with one or more outside entities such as the internet, the cloud, etc.

The work center may also include a CAD system and one or more client interface devices. The CAD system is generally used by engineering personnel to facilitate part design, and the client interface devices are generally useful by engineering and/or shop floor personnel to facilitate allowing such personnel to communicate with the work center.

The interactive process plan automation control (IPPAC) may be effective for
1) receiving and reading a first CAD geometry file,
2) obtaining stored information from at least one database,
3) communicating with the CAM system,
4) developing a first process plan using information obtained from the first CAD geometry file, from at least one database, and from said CAM system; and
5) communicating with a work center to implement a first process plan;
wherein the first process plan includes:
   i) a machining control plan comprising a cutting path and other CNC commands including speed and feeds;
   ii) a materials and parts control plan comprising one or more of material selection, material movement, fixturing control, operator interaction, part movement, and other post-machining actions; and
   iii) a monitoring and control plan comprising one or more of process status checks, part dimensionality checks, machine performance checks, and other process plan measurement requests.

The invention additionally provides a method for subtractive machining. One embodiment of the inventive method comprises:
a) providing a subtractive machining work center, comprising:
   1) machine frame components;
   2) material and parts handling components;

3) work center control components; and
4) an external communications device;

wherein the machine frame components may include any or all of:
  a) a machine base;
  b) a fixturing table and fixturing system;
  c) a CNC;
  d) a column;
  e) a spindle; and
  f) a cutting tool.

wherein the material and parts handling components may include any of all of:
  a) material handling robotics;
  b) machined part robotics;
  c) material scanning/viewing system;
  d) machined part scanning/viewing system;
  e) stock material rack;
  f) tool magazine; and
  g) part output rack;

wherein the control center components may include any or all of:
  a) an interactive process plan automation control (IPPAC) control center
  b) robotics controller (may include raw material handling robotics control and/or machined part handling robotics control);
  c) scanner/viewer controller (may include raw material handling scanner/viewer and/or machined part handling scanner/viewer);
  d) fixturing control; and
  e) interactive process plan automation control (IPPAC); and wherein the IPPAC may include any or all of:
  i) SCADA hardware & software, which may include SCADA supervisory control and/or SCADA data acquisition components;
  ii) process planning/editing hardware & software;
  iii) Process control hardware & software;
  iv) CAM hardware & software;
  v) device command interpreter;
  vi) internal communications hardware & software; and
  vii) database hardware & software;

b) entering a part design criteria into a CAD system to obtain a first CAD geometry file;
c) providing said first CAD geometry file to said interactive process plan automation control of said work center;
d) developing a first process plan; and
e) communicating with the work center to implement the process plan to machine a part.

The inventive method may also include automatically inspecting the part during the machining process and generating part inspection information, and thereafter using that part inspection information and said interactive process plan automation control to modify the first process plan to provide a second process plan, and thereafter implementing said second process plan to machine a part using a subtractive machine tool.

It can be seen from the above that one aspect of the present invention provides a work center effective for providing real-time discrete process control on a machine shop floor. Accordingly, in its broadest aspects, the invention may utilize what are commonly referred to as "Supervisory Control and Data Acquisition" ("SCADA") concepts, although those concepts are applied in novel ways using the hardware and software of the present invention.

In another aspect, the present invention improves process planning for discrete part manufacturing, execution, and automation system interaction through the application of cloud-based and mobile computing technologies. This improves access to and streamlines the creation of machining process knowledge, facilitates collaboration among the people responsible for the part manufacturing process plan and execution, and provides real-time control of and feedback from the machining processes and automation systems in the process plan.

WRITTEN DESCRIPTION OF THE PREFERRED EMBODIMENTS

Figure 1:
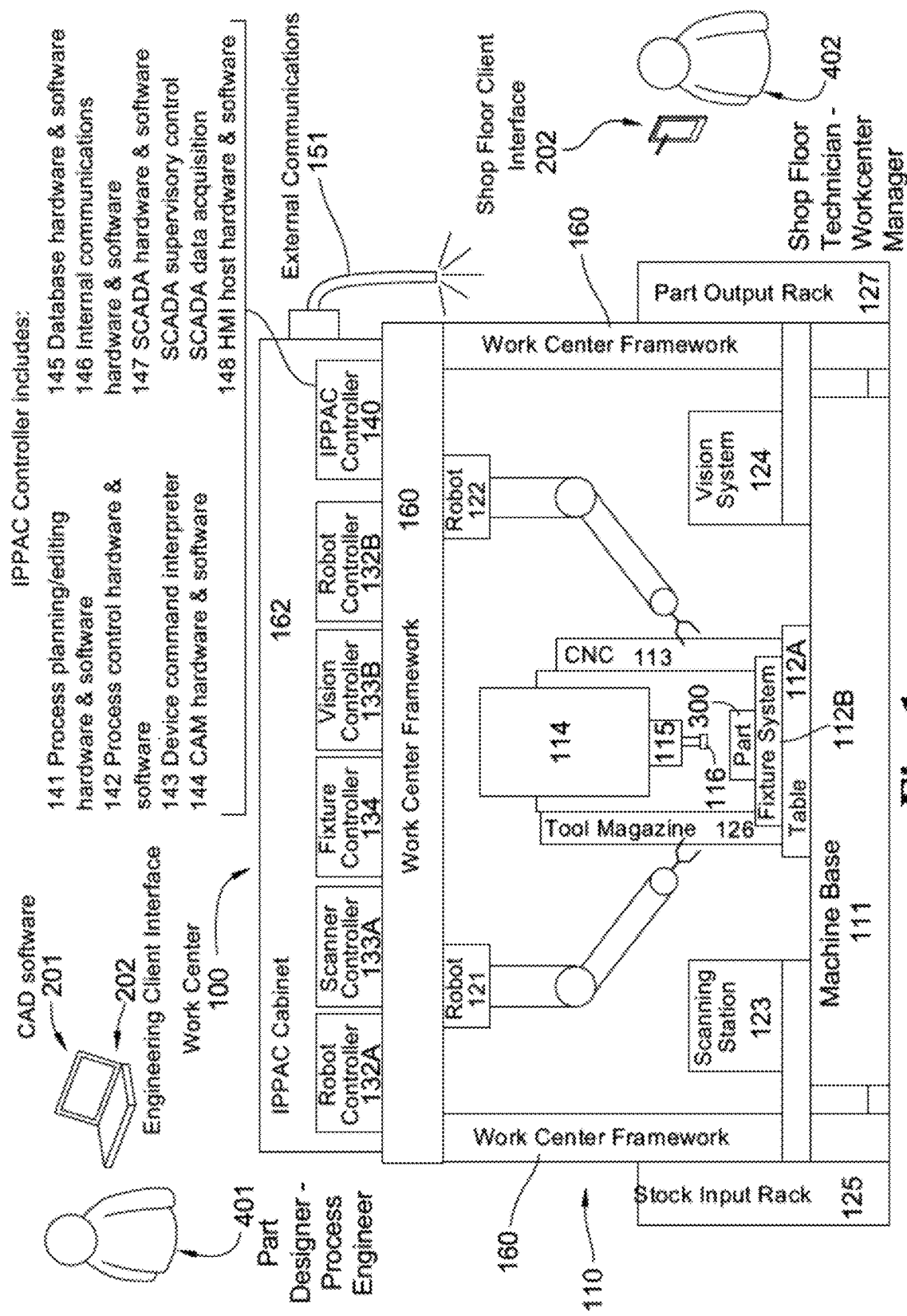
FIG. 1 shows the work center of the present invention according to one preferred embodiment.

For the purposes of promoting an understanding of the principles of the invention, reference will now be made to certain embodiments and specific language will be used to describe the same. It will nevertheless be understood that no limitation of the scope of the invention is thereby intended, with such alterations and modifications to the illustrated device being contemplated as would normally occur to one skilled in the art to which the invention relates.

One aspect of the present invention provides a work center that integrates and is compatible with existing CNCs, robot controllers, CMM controllers, tool condition monitoring systems, motorized palette shuttles, etc. In one embodiment the inventive work center allows a designer to request a finished part directly from a machine tool via a subtractive manufacturing process. Just as someone using a word processor requests a document from a paper printer, and similarly as a designer directly requesting a 3D printed object via an additive manufacturing process, the present invention allows a requestor to produce a finished machined part as simply as printing a document. Accordingly, the present invention provides a system and method for augmenting and coordinating prior art "islands of automation," and for providing additional functionality heretofore unobtainable with prior art systems.

As one example of the inventive work center operations, a designer creates part via CAD system to be machined on the work center. The designer may then select certain desired work center materials and tools to use in the part machining process. Upon selection, an interaction takes place between the designer/process engineer and the work center where part parameters are provided and a process plan is generated. Once the designer satisfies the work center requirements, the work center control components prepare the work center to machine the part design. The shop floor technician is alerted to be ready, if necessary, to support or intervene in the process. The work center then initiates subtractive machining. Upon completion of machining, work center confirms the results versus the desired specifications. The work center then transfers completed part to output rack, and notifies the technician and designer that the part is complete.

To more particularly point out and distinctly describe certain aspects of the present invention, one embodiment the inventive work center comprises:

1) machine frame components;
2) material and parts handling components;
3) work center control components; and
4) external communications center.

The machine frame components may include any or all of:
a) a machine base;
b) a fixturing table and fixturing system;
c) a CNC;
d) a column;
e) a spindle; and
f) a cutting tool.

The material and parts handling components may include any of all of:
a) material handling robotics;
b) machined part robotics;
c) material scanning/viewing system;
d) machined part scanning/viewing system;
e) stock material rack;
f) tool magazine; and
g) part output rack.

The work center control components may include any or all of:
a) robotics controller(s) (may include raw material handling robotics control and/or machined part handling robotics control);
b) scanner/viewer controller(s) (may include raw material handling scanner/viewer and/or machined part handling scanner/viewer);
c) fixturing control; and
d) an interactive process plan automation control (IPPAC).

The IPPAC may include any or all of:
i) process planning/editing hardware & software;
ii) process control hardware & software;
iii) device command interpreter;
iv) CAM hardware & software;
v) SCADA hardware & software, which may include SCADA supervisory control and/or SCADA data acquisition components;
vi) database hardware & software; and
vii) internal communications hardware & software.

The work center may also include external communications hardware & software. The external communications hardware and software may include hardware and software effective for communicating with a parts designer, hardware and software effective for communicating with a work center operator, and hardware and software effective for communicating with the internet.

As indicated above, the work center may also include a CAD system and one or more client interface devices. The CAD system is generally used by engineering personnel to facilitate part design, and the client interface devices are generally useful by engineering and/or shop floor personnel to facilitate allowing such personnel to communicate with the work center.

In another embodiment the inventive system comprises:
a) a networked (local network with internet access) set of end-user oriented (design engineer/manufacturing engineer/machine shop operations personnel) application software for desktop and/or mobile computing platforms (e.g., iOS or Android) enabling access to machining process planning software, digital machining process knowledge base, shop resident machine systems profile data, and real-time part machining process status information.
b) a cloud-based (hosted and internet connected) set of application software supporting creation of process plans and the workflows necessary for geometric part model manipulation, part machining feature identification, machine tool selection, cutting tool selection, material selection, step-by-step machining job execution, and real-time machining process knowledge base update and management.
c) a networked (local area network with internet access) supervisory controller and data acquisition (SCADA) system for every group of machine tools and peripheral devices (manual or automated) integrated into the process workflow plan for the part being machined, with the SCADA system typically comprising industrially robust hardware, software, I/O, local real-time databases, and networked communications components, and with the monitoring and control features necessary to present and manage the real-time workflow operations during preliminary part staging, actual part cutting, and subsequent part handling and measurement operations defined by the process plan;
d) at least one automated machine tool and the related (manual or automated) peripheral devices required to process the machining, handling, and observation of a workpiece from its raw state to its dimensionally correct finished state.

The present invention improves workflow interactivity, process efficiency, and the accuracy of traditional prismatic part machining. Engineering-centric collaboration may be offered via mobile computing devices and cloud-based application domain knowledge resources. This may be accomplished through the partial or complete automation of specific processes which have previously been performed manually (by machinists/operators) and by collecting, organizing, and interpreting process data automatically (e.g. process status, part dimensionality, machine performance metrics, etc.) resulting from execution of processes in the job work-flow.

The application of the present invention to traditional machining job workflow management will result in labor savings on the shop floor, improved access to real-time machining process status by shop management and their customers, and improved part-to-part consistency through data analytics, trend analysis, and potential process modification as workpiece workflow process steps are completed.

In view of the above it can be seen that the preferred interactive process plan automation control is effective for
1) receiving and reading a first CAD geometry file,
2) obtaining stored information from at least one work center database,
3) communicating with the CAM system,
4) developing a first process plan using information obtained from said first CAD geometry file, from said at least one database, and from said CAM system; and
5) communicating with a work center to implement said first process plan.

The first process plan preferably includes:
a) a machining control plan comprising a cutting path and other CNC commands including speed and feeds;
b) a materials and parts control plan comprising one or more of material selection, material movement, fixturing control, operator interaction, part movement, and other post-machining actions; and
c) a monitoring and control plan comprising one or more of process status checks, part dimensionality checks, machine performance checks, and other process plan measurement requests.

It is to be appreciated that the present invention is disclosed in the context of a subtractive machining work center. However, other aspects of the present invention provide a work center using one or more of the following in addition to, or instead of, the described subtractive machining cutting tool: a CNC lathe, a CNC water jet, a CNC laser, a CNC plasma cutter, a CNC electrical discharge machine (EDM), etc.

1. The Machine Frame Components.

The inventive work center includes machine frame components effective to machine a starting material to make a machined part. In the most preferred embodiments the machine tool components comprise:
  i) a machine tool base,
  ii) a fixturing table and fixturing system,
  iii) a CNC,
  iv) a subtractive material transformer.
  a) The Machine Tool Base.

The inventive work center may include a machine tool base to support the machine tool that performs the machining operations.
  b) The Fixturing Table and Fixturing System.

The inventive system preferably includes hardware and software to control material fixturing. When the material is provided to the work station, material fixturing hardware and software may be used to hold the material/part is the proper place, and at the proper orientation, during the machining process. Movement of the material/part during the machining process may be required.
  c) The CNC.

The machining of the desired part is performed at a work center that preferably uses a computer numerical control (CNC) cutting tool system that is effective for machining a designed part using tool path information. The CNC may use RS274D tool path information, or tool path information provided in another format.
  d) The Subtractive Material Transformer.

The inventive work center preferably includes a subtractive material transformer. In one preferred embodiment the subtractive material transformer comprises a subtractive machining tool, comprising a column, a spindle, and a cutting tool. The column may support the spindle and the cutting tool. The spindle may hold and turn the cutting tool that performs the machining operations. The cutting tool performs the subtractive machining operations. The cutting tools are preferably stored in and selected from a tool magazine that contains various cutting tools effective for various cutting operations.

As indicated above, in other embodiments the subtractive material transformer may include a CNC lathe, and/or a CNC water jet, and/or a CNC laser, and/or a CNC plasma cutter, and/or a CNC electrical discharge machine (EDM).

2. The Materials and Parts Handling and Viewing Components.

The work center may also include an inspection system to inspect materials and parts pre-process, during the machining process, and post-process. For example, one or more viewers may be used to view materials and/or parts at any desired time. The process/part viewer may create a part preview, and may facilitate viewing of the process being executed. The process/part inspection hardware may be linked to an operator terminal, and/or may be linked to the IPPAC.

In the most preferred embodiments the materials and parts handling and viewing components include components effective to move material to the fixturing table, scan or view the materials before machining, fixture the materials for machining, scan or view the materials during machining, scan or view the materials after machining, and move the machined part for further handling/processing. In the most preferred embodiments the material and parts handling and viewing components comprise:
  i) material handling robotics,
  ii) machined part robotics,
  iii) a material scanning/viewing system,
  iv) a machined part scanning/viewing system,
  v) a stock material rack,
  vi) a tool magazine, and
  vii) a parts output rack.
  a) The Material Handling Robotics.

The work center preferably includes robotics for handling the material to be machined. The material handling robotics is adapted to select a material blank from a stock material rack, and to move the blank to the fixturing table. In the context of this specification, the term material handling "robotics" means any automated material handling system, and is not limited to robotic arms or their equivalent.
  b) The Machined Part Robotics.

The work center preferably includes robotics for handling the machined part after it has been machined. The machined part handling robotics is adapted to move a machined part from the fixturing table to a parts output rack. In the context of this specification, the term machined part "robotics" means any automated machined part handling system, and is not limited to robotic arms or their equivalent.
  c) The Material Scanning/Viewing System.

The work center may also include an inspection system to inspect materials and parts pre-process, during the machining process, and post-process. For example, one or more viewers may be used to view materials and/or parts at any desired time. The process/part viewer may create a part preview, and may facilitate viewing of the process being executed. The process/part inspection hardware may be linked to an operator terminal, and/or may be linked to the IPPAC.

Accordingly, the work center preferably includes a material scanning and/or viewing system for scanning and/or viewing the material to be machined. The material scanning and/or viewing system is adapted to observe substantially all portions of a material blank before and/or during fixturing on the fixturing table.
  d) The Machined Part Scanning/Viewing System.

As indicated above, the work center preferably includes a machined part scanning and/or viewing system for scanning and/or viewing the material during and/or after the machining process. The machined part scanning and/or viewing system is adapted to observe substantially all portions of a part being machined during and/or after the machining process.
  e) The Stock Material Rack.

The work center preferably includes a stock material rack for storing and holding the material to be machined. The stock material rack is adapted to hold a selection of one or more material blanks that may be machined by the work center, and to hold them prior to transfer to the fixturing table.
  f) The Tool Magazine.

The work center preferably includes a tool magazine for storing and holding the various cutting tools that may be used to machine a part. The tool rack is adapted to hold a selection of tools that may be used by the work center, and to hold them prior to transfer to the spindle.
  g) The Parts Output Rack.

The work center preferably includes a parts output rack for storing and holding the parts after they have been machined. The stock material rack is adapted to receive and hold a variety of similar or dissimilar parts after they have been machined by the work center.

3. The Control Center Components.

The inventive work center also includes control center components. In the most preferred embodiments the control center components include components to control the robotics, components to control the scanners and/or viewers, components to control the fixturing, and components to control the interactive process plan automation.

More specifically, the control center components may comprise:
i) a robotics controller, which may include a raw material handling robotics control and which may include a machined part handling robotics control,
ii) a scanner/viewer controller, which may include a raw material handling scanner/viewer and which may include a machined part handling scanner/viewer,
iii) fixturing control; and
iv) interactive process plan automation control (IPPAC).

The IPPAC may comprise:
i) SCADA hardware & software,
ii) SCADA supervisory control,
iii) SCADA data acquisition,
iv) process planning/editing hardware & software,
v) process control hardware & software,
vi) CAM hardware & software,
vii) device command interpreter,
viii) internal communications hardware & software, and
ix) database hardware & software.

a) The SCADA Hardware and Software.

The work center control components preferably include SCADA hardware and software. The SCADA hardware and software preferably includes SCADA supervisory control, and SCADA data acquisition components.

i) The SCADA Supervisory Control.

The supervisory control and data acquisition (SCADA) system supervisory control and communication module is preferably configured for the specific work center, including particularly the machine tool and other accessories that are to be coordinated by and connected to the SCADA system. Key responsibilities include:
Work center configuration management
Work center intelligence/system logic and execution control
Bi-directional data transfer to external systems The SCADA supervisory controller provides the supervisory control for the work center. The SCADA supervisory control operates in real time, preferably using the real time databases of the IPPAC. The SCADA supervisory controller provides commands to the robotics, viewing, and fixturing controls, and generally uses commands derived from the process plan or received from the operator.

ii) The SCADA Data Acquisition.

The IPPAC may include one or more modules that allow the IPPAC to receive, archive and communicate incoming data from the work center controllers and machining process. The data received and processed by the IPPAC data collection system may include machine status, cutting status, vision system information, etc., as well as inspection information from materials and parts inspections pre-process, during the machining process, and post-process.

b) The Process Planning/Editing Hardware and Software.

The work center control components may include a process planner/editor. The process planner/editor assembles and edits the process plan file driven by inputs from the client interface software and/or the process controller.

c) The Process Control Hardware and Software.

The work center control components also include process control. A process plan file for the IPPAC work center is a set of instructions, logic, and parameters which when executed in a predetermined sequential order by the IPPAC work center controllers and machine systems leads to the creation of a desired machined part from an input blank, stock material, or previously machined part.

The process control hardware and software provide the ability to monitor and influence the discrete and continuous work center processes associated with material transformation and/or removal based on feedback from process sensors and/or the IPPAC work center controllers and systems during process execution. (E.g. part dimensionality, part surface finish, cutting tool vibration levels, cutting force levels, part material temperatures, spindle torque levels, etc.)

The IPPAC may include discrete and continuous process controllers.

A discrete process controller compares, at sequentially predetermined times during the execution of the process plan, the desired attributes of the part to be machined (stored in the process plan) with the as-measured attributes of the actual part being machined (measured by the data acquisition system). With knowledge of the comparison differences, the discrete controller may then influence the first process plan (via the process editor) by modifying machine system, tooling selection, tool path, or part feature parameters in order to compensate for the observed differences thereby creating a second process plan. The execution of the second process plan on the next part to be machined should then reduce the difference between the desired part attributes and the observed part attributes on the next part, thus "directly" closing the "discrete process control loop".

A continuous process controller compares the desired parameter values of a real-time continuous process (E.g. cutting tool feed rate, spindle rpm, cutting tool vibration level, spindle torque, cutting process sound level, etc.), utilized during the execution of the process plan, with the measured parameter values of those real-time processes. With knowledge of the comparison differences, the continuous controller may then influence the real-time continuous processes by modifying a control parameter (E.g. cutting tool feed rate override level, spindle RPM override level, depth of cut, part material temperature setpoint, coolant temperature setpoint, etc.) associated with the directly controllable real-time process thereby compensating for the observed differences. This real-time compensation will improve the execution accuracy of the related discrete process plan through improved part feature dimensional results thus "indirectly" closing the "discrete process control loop".

d) The CAM Hardware and Software.

The work center control components may include computer-aided manufacturing (CAM) hardware and software that is effective for developing tooling and tool path information from a CAD geometry file. The CAM system preferably cooperates with a computerized numerical controlled (CNC) subtractive machining system comprising a subtractive machine tool and effective for implementing tooling and tool path information on said subtractive machine tool to machine a part from a stock material.

The CAM system may include CAM system integration software code. This code may be embedded in the IPPAC and may integrate the CAM system with the other systems and desirably facilitates the following:

Interfaces with the SCADA and communication component

"STEP" (ISO 10303) compliance

Regeneration and modification of the toolpaths.

e) The Device Command Interpreter.

The IPPAC may include a device command interpreter. The device command interpreter executes the process plan and translates process plan commands (which may be. for example, STEP and/or RS274D commands) to machine specifics commands.

f) The Internal Communications Hardware and Software.

The work center preferably comprises one or more communication modules to facilitate internal work center communications, including internal communications between the various control center components, including the IPPAC, and communications between the IPPAC and the machine frame components and/or material and parts handling components of the work center. As will be discussed below, the work center may also include external communications hardware to facilitate communications between the work center and an operator and/or the CAD system.

g) The Database Hardware & Software.

The work center preferably comprises one or more electronic-readable databases comprising materials information, fixturing information, cutting tool availability, and machine tool operating parameters.

The IPPAC may include real-time databases of the information that the IPPAC requires to create a process plan. For example, the real-time database may include the work center process plan data and status collected during execution, e.g., information regarding the machine tool, accessories, inspection equipment, and material handling systems, as well as library data, e.g., fixtures, tools, material, machine attributes.

In the most preferred embodiments a user may run the following at the IPPAC application command prompt:

a) Select previous job from and ERP system;
b) Machine a part or display the contents of a machining queue;
c) Display or control machining jobs;
d) Adjust parameters and request number of parts;
e) Receive requests from and respond to the IPPAC system;
f) Select material, material attributes and part setup;
g) Preview the completed part.

The IPPAC preferably outputs a set of instructions (working steps) to be executed by the work center. The process plan is a file that can be stored on an enterprise resource planning (ERP) system or a manufacturing execution system (MES).

The process plan steps may include one or more of the following:

a) Setup and initialization section; turn-on, calibrate, verify conditions;
b) Execution; move tools, get material, pre-inspect, begin cutting;
c) Specifies feedback requirements;
d) Termination/changeover section.

The IPPAC preferably allows human machine interface (HMI) interaction with each machine and its peripherals. The operator may respond to prompts and/or monitor the process plan.

The IPPAC may be networked such that, when selected via the work center's IPPAC client app, it communicates with the CAD system to obtain the CAD file, communicates with the various databases to obtain process parameters, communicates with the CAM system to develop a process plan, and communicates with the work center CNC via the SCADA platform to execute the process plan and machine a part. Accordingly, the IPPAC may be completely resident on a networked computing device near the machine frame or it may reside partially in the "Cloud" (on remote servers) with some portion residing near the machine frame (on a less capable computer) depending on the level of real-time response required in a specific manufacturing application. This computer partitioning is simply a design decision, and both methods are within the scope of the claimed invention. In either case, the CAM software does not need to be in direct communication with the CAD, CNC, or work center devices/components. It will communicate with the internal software components (within the wrapper) of the IPPAC, which will communicate with the CAD application, the CNC system, and will be transferring files and sending control commands to; while reading signals and gathering data from the work center devices.

4. The External Communications Center.

The inventive work center also includes an external communications center for allowing the work center to communicate with outside entities. In the most preferred embodiments the external communications center enables the work center to communicate with people or entities outside the work center, such as a parts designer, a work center operator, the internet (including cloud-based components), or other shop communications links.

5. The Computer-Aided Design (CAD) System.

The inventive machining work center is adapted to function with, and may comprise, a computer-aided design (CAD) system. The CAD system is effective for transforming part design criteria into a first CAD geometry file. The first geometry file can typically be read by a CAM system, or more preferably by the interactive process plan automation control of the present invention.

6. The Client Interface.

The inventive work center preferably is packaged with an interactive process plan automation control (IPPAC) client interface to facilitate the interactions between the work center and an operator. The IPPAC client interface device may be a computer, tablet, or smartphone application, for example, or other technology that provides an interface between the operator and the work center. The interactive process plan automation control may be networked such that, when selected, it communicates with the CAD system to obtain the CAD file, communicates with the various databases to obtain process parameters, communicates with the CAM system to develop a process plan, and communicates with the work center CNC to execute the process plan and machine a part. Preferred client interfaces include a client interface with engineering personnel to facilitate part design and engineering, and a client interface with shop floor personnel to facilitate operations by shop floor technicians and/or work center managers.

The IPPAC client interface allows the user to review available work centers, select the best fit, supply the process parameters required to generate provisional process plan (e.g., CAD file, material, fixturing, inspection criteria, throughput requirements, tolerance criteria and feedback requirements, request part preview, which generates a provisional process plan and simulated working steps (graphical rendering), interpret process plan and rendering, edit and/or approve a process plan, and execute (clicks-on) the process plan.

In a typical work center environment, the IPPAC client interface is installed on the CAD operator's computer, and a device driver is provided. The IPPAC client interface may then display data through a Graphical Device Interface (GDI) to allow the user to manipulate data. When the IPPAC client interface is opened, the user makes the necessary selections and then CAD data is transferred from the GDI into the IPPAC system. The IPPAC caches the data, creates a process plan through the embedded coordinated systems for the machine tool that the user previously selected. The IPPAC translates the plan into a format that the work center systems understand and executes the process plan. The IPPAC client interface can also serve as the connection to the Enterprise Resource Planning (ERP) system or manufacturing execution system (MES).

The use of "embedded" CAM software and additional interactive process planning functions in the IPPAC allows the user to 1) initially create the "Process Plan" (which includes the "Machining Plan" above and additional items such as: measurement commands/checkpoints, part movement commands, fixturing control commands, operator instructions, number of parts, etc.) and 2) subsequently modify the process plan based on preset part checkpoints as compared to corresponding feature measurements of the part being machined. This is a unique approach to the part-manufacturing problem that is not provided or suggested by existing systems.

7. The Process Plan.

As previously indicated, the interactive process plan automation control develops a process plan that may be communicated to the work center and implemented by a CNC tool to machine a desired part. In general, the process plan is a set of instructions that can be executed by the work center. Common working steps may include: setup and initialization, including turn-on, calibrate, and verify conditions; execution, including move tools, get material, pre-inspect, and begin cutting; specifying feedback requirements; and termination and/or changeover instructions. In some embodiments the process plan may be a file that can be stored on an ERP system or manufacturing execution system (MES).

The process plan may comprise:
  a) a machining control plan comprising a cutting path and other CNC commands including speed and feeds;
  b) a materials and parts control plan comprising one or more of material selection, material movement, fixturing control, operator interaction, part movement, and other post-machining actions; and
  c) a monitoring and control plan comprising one or more of process status checks, part dimensionality checks, machine performance checks, and other process plan measurement requests.

The machining control plan identifies machinable portions of a stock material, and subsequently generates tool path information for machining that stock material, and is typically provided in RS274D format. The machining control plan also provides feeds and speeds to guide the operation of the machine tool. In some embodiments the machining control plan may identify the work center to be used, and may control the loading and operation of the machine tool in the work center.

The materials and parts control plan preferably uses information selected from the databases, including material location information, material movement information, blank inspection commands, machined part inspection commands, quantities to be machined, and operator instructions to generate the process plan. The materials and parts control plan may provide material and/or fixturing control, part movement and/or placement commands, blank and/or part inspection commands, the number of parts to be machined, operator instructions, in-process monitoring and/or checkpoint times, and "six sigma" inputs.

The monitoring and control plan preferably comprises one or more of the following: process status checks, part dimensionality checks, machine performance checks, and other process plan measurement requests.

Using the process plan the inventive work center enables an interactive method of constructing and controlling a sequence of process working steps that will systematize and facilitate the automation of a discrete process plan. The IPPAC portion of the work center commands and monitors all of the equipment necessary to carry out the process plan. It also provides an interactive user interface to direct the actions of shop floor personnel during automated machining/finishing and/or manual process working steps including process data collection and feedback assuming automation equipment does not exist for the working step.

The process plan preferably comprises three, inter-related "sequence control plans":
  1) Material Handling (Part/Fixturing/Inspection) Plan
  2) Operations (Tooling/Machining/Finishing) Plan
  3) Process Monitoring and Control Plan These three sequence control plans are built with a series of Function and Command blocks (a set of instructions, logic, and parameters). A Function block controls and monitors a piece of automation equipment. A Command block guides the actions of and feedback from shop floor personnel via the IPPAC interactive user interface. For example, a top-level Process Plan flow might look like this:
  1. Set-up and configure the work center,
  2. Locate and stage the material/fixturing/inspection equipment for machining. (See Material Handling (Part/Fixturing/Inspection) Plan A below.)
  3. Machine, Finish, and Inspect the part. (See Tooling/Machining/Finishing Plan B and Process Monitoring and Control Plan C below)
  4. Repeat on another part? (Go to Step 2)
  5. Stop Plan A—The Material Handling Plan consists of a series of function/command blocks for fixturing control, material preparation, material movement, operator guidance/feedback, and off-machine inspection operations.

Plan B—The Operation Plan consists of a sequence of function/command blocks for tooling selection, cutting path, CNC system monitoring, feedrate/spindle speed overrides, m-function assertion, operator guidance/feedback, and on-machine inspection operations.

Plan C—The Process Monitoring and Control Plan consists of the function/command blocks required to compare actual Plan A and Plan B working step results with desired working step results.

Sequence coordination and interaction between the Material Handling Plan, the Operations Plan, and the Process Monitoring and Control Plan will be required.

The IPPAC system will leverage a combination of hardware and software components:

Direct Numerical Control-Overall Equipment Effectiveness (DNC-OEE) software and hardware from the machine monitoring market, SCADA software and related hardware from the continuous process control market, "Embedded" CAM software from the machine tool and metalworking market, "Industrial Internet of Things" connectivity technology and, Proprietary Interactive Process Planning Automation software.

8. Machining Process Client Application.

The inventive system may also include a machining process client application to allow human-machine interface (HMI) interaction with each machine and its peripherals. The machining process client application may facilitate a prompt/response dialog with an engineer or shop floor technician, and has the ability to monitor the process plan.

Referring now to the drawings, FIG. 1 shows the inventive work center according to one preferred embodiment. The illustrated work center 100 includes machine frame components 110, material and parts handling components 120, control center components 130, external communications center 140, and work center framework 150.

Machine frame components 110 include machine tool base 111, fixturing table 112A and fixturing system 112B, CNC 113, column 114, spindle 115, and head 116.

Material and parts handling components 120 include material handling robotics 121, machined part robotics 122, material scanning/viewing system 123, machined part scanning/viewing system 124, stock material rack 125, tool magazine 126, and part output rack 127.

Control center components include robotics controller(s) 132 (including raw material handling robotics control 132A and machined part handling robotics control 132B), scanner/viewer controller(s) 133 (including raw material handling scanner/viewer 133A and machined part handling scanner/viewer 133B), fixturing control 134, and interactive process plan automation control (IPPAC) 140. The control center components may be contained in a work center control cabinet 162.

The IPPAC may include process planning/editing hardware & software 141, process control hardware & software 142, device command interpreter 143, CAM hardware & software 144, database hardware & software 145, internal communications hardware & software 146, and SCADA hardware & software 147. The SCADA hardware & software 147 may include SCADA supervisory control and SCADA data acquisition.

The illustrated work center also includes external communications hardware & software 151 effective to communicate with an engineering client interface 202A effective for use by a parts designer/process engineer 401, and/or a shop floor client interface 202B effective to communicate with shop floor technicians and/or work center managers 402. IPPAC client interface 202A may incorporate or interface with CAD software 201 to facilitate communications with parts designer/process engineer 401.

As described above, work center 100 is effective for: 1) receiving and reading a first CAD geometry file; 2) obtaining stored information from the work center database(s); 3) communicating with the CAM system; 4) developing a first process plan using information obtained from said first CAD geometry file, from said at least one database, and from said CAM system; and 5) communicating with said work center to implement said first process plan.

The inventive work center shown in FIG. 1 may be used to provide a method for subtractive machining. One method of using the inventive system comprises providing the work center shown in FIG. 1, entering a part design criteria into said CAD system to obtain a first CAD geometry file, providing said first CAD geometry file to said interactive process plan automation control; developing a first process plan; and communicating with said work center to implement said first process plan to machine a part. The inventive method may also include automatically inspecting the part during the machining process and generating part inspection information, and thereafter using that part inspection information and said interactive process plan automation control to modify said first process plan to provide a second process plan, and thereafter implementing said second process plan to machine a part using a subtractive machine tool.

Figure 2:
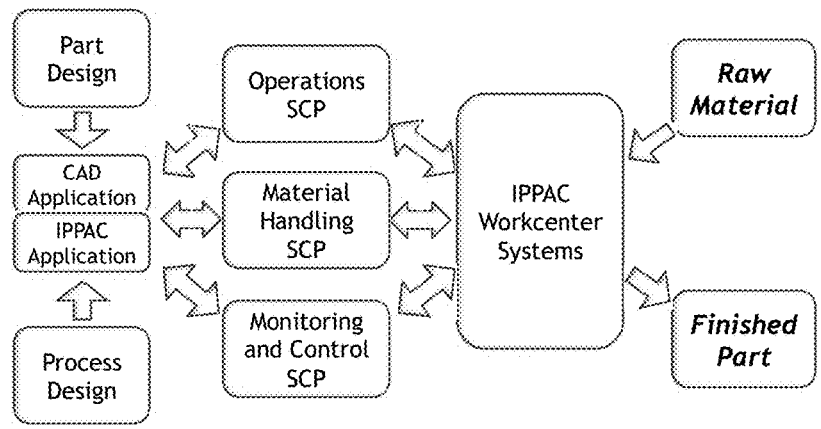
FIG. 2 shows the work flow of the present invention, according to one preferred embodiment.

FIG. 2 shows the primary work activities and command/data flows within the IPPAC portion of the work center system as follows:

1. The part design information as input by the part designer;
2. The process design information as input by the process designer;
3. The CAD application processes part design information and creates the part design file.
4. The IPPAC HMI host permits user access to the IPPAC software and hardware systems that create the process plan file consistent with the part design file and user process design input. The double ended arrows indicate the there is an interactive two-way flow of information between the IPPAC and the user.
5. The IPPAC Process Plan (generated by the IPPAC software and hardware based on the part design file and user process plan input) is composed of three sequence control plans (SCPs) which are interpreted in parallel by the IPPAC during process plan execution. (Operations, Material Handling, Monitoring/Control)
6. The work center performs the actual material handling and material transformation on the raw material fed into the work center to create the finished part coming out of the work center. The double-ended arrows indicate that the IPPAC is not only sending commands to the work center but is also getting feedback from the work center It is to be appreciated from FIG. 2 that the IPPAC approach provides the tools and methods necessary to take part design and process design information, interactively create a process plan, then execute the process plan through an IPPAC work center to create a finished part from raw material.

Figure 3:
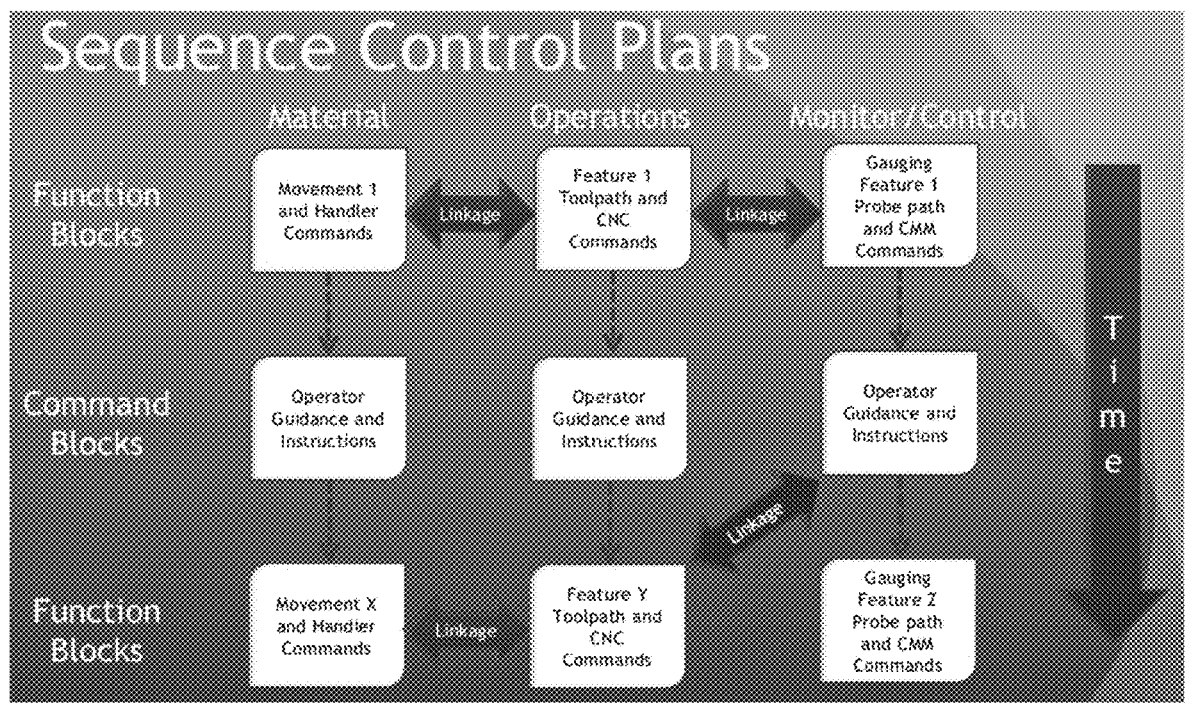
FIG. 3 shows the sequence of control plans used by the work center of the present invention, according to one preferred embodiment.

FIG. 3 depicts the composition of the process plan as function and command data structures (blocks) composed of three types of instructions sets, the parallel interpretation of the sequence control plans, and the inter-dependent nature of the three sequence control plans as follows:

1. Functions blocks (data structures) contain instructions and information pertaining to work required from a work center component (e.g. machine tool, robot, vision system, etc.)
2. Command blocks (data structures) contain instructions and information pertaining to work required from a human technician or operator.
3. All three types of sequence control plans are composed of function blocks and/or command blocks, in any order.
4. The sequence control plans are executed in parallel (concurrently in computer terms) and sequentially over time, as stored in the sequence control plan file.
5. The execution of any sequence control plan can be made dependent on the execution of either or both of the other sequence control plans at any point in that sequence control plan. The use of this feature will be dependent on the requirements of the process plan being implemented by the work center but is necessary to coordinate the flow of working steps in the work center.

It is to be appreciated from FIG. 3 that the process plan is managed and executed by the IPPAC work center through the use of three interdependent programs (sequence control plans) which are created (prior to execution) interactively by the user via the client software/process editor and then executed concurrently via the device command interpreter in the IPPAC System.

It can be seen from the above that the inventive process makes cutting parts as easy as 3D printing by providing a system that integrates islands of automation. The inventive system allows a designer to request a finished part directly from a machine tool via a subtractive manufacturing process. Just as someone using a word processor requests a document from a paper printer, and similarly as a designer directly requesting a 3D printed object via an additive manufacturing process, the present invention allows a requestor to produce a finished machined part as simply as printing a document.

Using the inventive system a designer or human-machine interface (HMI), after completing the Computer Aided Design (CAD), selects "create-the-part" or "machine-the-part" (similar to selecting a "printing" function via a word processor's navigation window or selection pane.) Following the request, a machining navigation window or selection pane outlines the machining parameters. This utility confirms or adjusts part data, part information, material selection, quality, material layout, and material/fixture attributes, along with quantity desired and part preview or simulation. Once the designer satisfies the information requested in the navigation window/selection pane, the request is managed and then navigated via a computer-controlled system of software and hardware to a work center that produces the requested part.

During the machining process, interaction may occur between the many systems producing the part and the requestor. This is comparable to the interaction between a printer and the operator of a word processor. Such interaction may include status of the process, intervention requirements, and utilities to correct common problems.

After creating the CAD model, the inventive system provides the user with a method to: invoke supervisory and control functionality, review available work centers, select the best fit, supply process parameters required to generate provisional process plan (i.e. CAD file, material, fixturing, inspection criteria, throughput requirements, tolerance criteria and feedback requirements), request part preview, which generates a provisional process plan and simulated working steps (graphical rendering), interpret process plan and rendering, edit and/or approve the process plan, and execute the process plan.

The inventive system may be used to create a first process plan, and then to begin the execution of that plan, and then to generate information regarding the execution of the first process plan, and then to use that information to create a second, modified process plan, which may then be implemented. This allows the inventive system to learn from and adapt to specific and potentially changing work center conditions.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, it is to be appreciated that the present invention may comprise or consist essentially of any or all of the illustrated or described elements, including any and all combinations and sub-combinations. Additionally, any or all of the features, elements, and/or embodiments disclosed herein may be combined with any or all of the other features, elements, and/or embodiments disclosed herein to provide a system or method that comprises or consists essentially of such features, elements, and/or embodiments.

The phrase A "and/or" B is used in this disclosure to mean A alone, or B alone, or both A and B.

The invention claimed is:

1. A subtractive machining work center comprising:
   a) machine tool components adapted to subtractively machine a desired article using material and/or parts provided by the material and parts handling components;
   b) material and parts handling components adapted to provide material and parts to the machine tool components, and to remove a machined article away from the machine tool components;
   c) work center control components adapted to control robotics, scanners/viewers, and fixturing used by one or more of the machine tool components and/or the material and parts handling components, and to instruct an interactive process plan automation center to plan and process commands to one or more of the machine tool components and/or the material and parts handling components; and
   d) external communications components effective to communicate with a machining tool work center operator;
   wherein said machine tool components comprise:
      i) a machine tool base,
      ii) a fixturing table,
      iii) a CNC,
      iv) a spindle column, and
      v) a spindle head; and
   wherein said material and parts handling components comprise:
      i) material handling robotics,
      ii) machined part robotics,
      iii) a material scanning/viewing system,
      iv) a machined part scanning/viewing system,
      v) a stock material rack,
      vi) a tool magazine, and
      vii) a parts output rack; and
   wherein the work center control components comprise:
      i) a robotics controller, which may include a raw material handling robotics control and which may include a machined part handling robotics control,
      ii) a scanner/viewer controller, which may include a raw material handling scanner/viewer and which may include a machined part handling scanner/viewer,
      iii) fixturing control; and
      iv) an interactive process plan automation center (IPPAC) control;
   wherein the IPPAC control comprises:
      1) process planning/editing hardware and software including a non-transitory computer-readable storage medium encoded with a data structure adapted to plan and edit instructions to one or more of the machine tool components and/or the material and parts handling components;
      2) process control hardware and software including a non-transitory computer-readable storage medium encoded with a data structure adapted to plan and edit instructions to one or more of the machine tool components and/or the material and parts handling components;
      3) device command interpreter;
      4) CAM hardware and software including a non-transitory computer-readable storage medium encoded with a data structure adapted to instruct one or more of the machine tool components and/or the material and parts handling components;

5) SCADA hardware and software including a non-transitory computer-readable storage medium encoded with a data structure adapted to provide supervisory control and data instructions to one or more of the machine tool components and/or the material and parts handling components;

6) database hardware and software including a non-transitory computer-readable storage medium encoded with a data structure adapted to store data to be used by one or more of the machine tool components and/or the material and parts handling components; and 7) internal communications hardware and software including a non-transitory computer-readable storage medium encoded with a data structure adapted to facilitate communications between one or more of the machine tool components and/or the material and parts handling components.

2. The subtractive machining work center of claim 1 wherein said SCADA hardware and software includes SCADA supervisory control and SCADA data acquisition components.

3. The subtractive machining work center of claim 1 wherein said interactive process plan automation center is effective for developing a machining control plan that includes tool selection.

4. The subtractive machining work center of claim 1 wherein said interactive process plan automation center is effective for developing a machining control plan that includes in-process part monitoring commands.

5. The subtractive machining work center of claim 1 wherein said interactive process plan automation center is effective for developing a materials and parts control plan that includes pre-process material selection and/or handling commands.

6. The subtractive machining work center of claim 1 wherein said interactive process plan automation center is effective for developing a materials and parts control plan that includes in-process part movement, placement, and/or fixturing commands.

7. The subtractive machining work center of claim 1 wherein said interactive process plan automation center is effective for developing a materials and parts control plan that includes operator interactions.

8. The subtractive machining work center of claim 1 wherein said interactive process plan automation center is effective for developing a materials and parts control plan that includes inspection actions.

9. The subtractive machining work center of claim 8 wherein said inspection actions includes pre-process blank inspection commands.

10. The subtractive machining work center of claim 1 wherein said interactive process plan automation center is effective for developing a materials and parts control plan that includes post-machining actions.

11. The subtractive machining work center of claim 1 wherein said interactive process plan automation center includes CAM/SCADA integration control.

12. The subtractive machining work center of claim 1 wherein said interactive process plan automation center includes a real-time database.

13. The subtractive machining work center of claim 1 wherein said system processes data compliant with ISO 10303.

14. The subtractive machining work center of claim 1 wherein said at least one database comprises two or more members of the group consisting of fixturing information, cutting tool availability, material starting stock information, machine tool operating parameters.

15. A method for subtractive machining, comprising:
a) providing a subtractive machining work center, comprising:
1) machine tool components adapted to subtractively machine a desired article using material and/or parts provided by the material and parts handling components;
2) material and parts handling components adapted to provide material and parts to the machine tool components, and to remove a machined article away from the machine tool components;
3) control center components adapted to control robotics, scanners/viewers, and fixturing used by one or more of the machine tool components and/or the material and parts handling components, and to instruct an interactive process plan automation center to plan and process commands to one or more of the machine tool components and/or the material and parts handling components; and
4) external communications center;
wherein the machine tool components comprises:
a) machine tool base;
b) fixturing table;
c) CNC;
d) spindle head column; and
e) spindle head;
wherein the material and parts handling components comprises:
a) material handling robotics;
b) machined part robotics;
c) material scanning/viewing system;
d) machined part scanning/viewing system;
e) stock material rack;
f) tool magazine; and
g) part output rack;
wherein the control center components comprises:
a) an interactive process plan automation center (IPPAC) control center
b) robotics controller, which may include raw material handling robotics control and/or machined part handling robotics control;
c) scanner/viewer controller, which may include raw material handling scanner/viewer and/or machined part handling scanner/viewer;
d) fixturing control; and
e) IPPAC control, wherein the IPPAC Control comprises:
i) SCADA hardware and software including a non-transitory computer-readable storage medium encoded with a data structure adapted to provide supervisory control and data instructions to one or more of the machine tool components and/or the material and parts handling components;
ii) SCADA supervisory control;
iii) SCADA data acquisition;
iv) process planning/editing hardware and software including a non-transitory computer-readable storage medium encoded with a data structure adapted to plan and edit instructions to one or more of the machine tool components and/or the material and parts handling components;

v) process control hardware and software including a non-transitory computer-readable storage medium encoded with a data structure adapted to plan and edit instructions to one or more of the machine tool components and/or the material and parts handling components;

vi) CAM hardware and software including a non-transitory computer-readable storage medium encoded with a data structure adapted to instruct one or more of the machine tool components and/or the material and parts handling components;

vii) device command interpreter;

viii) internal communications hardware and software including a non-transitory computer-readable storage medium encoded with a data structure adapted to facilitate communications between one or more of the machine tool components and/or the material and parts handling components; and ix) database hardware and software including a non-transitory computer-readable storage medium encoded with a data structure adapted to store data to be used by one or more of the machine tool components and/or the material and parts handling components;

b) entering a part design criteria into a CAD system to obtain a first CAD geometry file;

c) providing said first CAD geometry file to said interactive process plan automation center;

d) developing a first process plan;

e) communicating with said work center to implement said first process plan to machine a part.

16. A method for subtractive machining comprising the method steps of claim 15, and further including automatically inspecting the part during the machining process and generating part inspection information, and thereafter using that part inspection information and said interactive process plan automation center to modify said first process plan to provide a second process plan, and thereafter implementing said second process plan to machine a part using a subtractive machine tool.

17. A method for subtractive machining comprising the method steps of claim 15, wherein said method includes:

1) receiving and reading a first CAD geometry file, 2) obtaining stored information from at least one work center database, 3) communicating with the CAM system, 4) developing a first process plan using information obtained from the first CAD geometry file, from at least one database, and from said CAM system; and 5) communicating with a work center to implement a first process plan;

wherein said first process plan includes:

i) a machining control plan comprising a cutting path and other CNC commands including speed and feeds; and ii) a materials and parts control plan comprising one or more of material selection, material movement, fixturing control, operator interaction, inspection, part movement, and other post-machining actions.

18. A method for subtractive machining comprising the method steps of claim 17, and further including automatically inspecting the part during the machining process and generating part inspection information, and thereafter using that part inspection information and said interactive process plan automation control to modify said first process plan to provide a second process plan, and thereafter implementing said second process plan to machine a part using a subtractive machine tool.

19. A method for subtractive machining comprising the method steps of claim 17, wherein said method includes:

1) receiving and reading a first CAD geometry file, 2) obtaining stored information from at least one work center database, 3) communicating with the CAM system, 4) developing a first process plan using information obtained from the first CAD geometry file, from at least one database, and from said CAM system; and 5) communicating with a work center to implement a first process plan;

wherein said first process plan includes:

a) a machining control plan comprising a cutting path and other CNC commands including speed and feeds;

b) a materials and parts control plan comprising one or more of material selection, material movement, fixturing control, operator interaction, part movement, and other post-machining actions; and c) a monitoring and control plan comprising one or more of process status checks, part dimensionality checks, machine performance checks, and other process plan measurement requests.

* * * * *